United States Patent [19]
Fannin et al.

[11] 3,951,463
[45] Apr. 20, 1976

[54] FLUID PRESSURE BRAKING SYSTEM INCLUDING A PRESSURE DIFFERENTIAL RESPONSIVE VALVE DEVICE

[75] Inventors: Richard C. Fannin, Elyria; Anthony B. Stellato, Grafton, both of Ohio

[73] Assignee: The Bendix Corporation, South Bend, Ind.

[22] Filed: Mar. 6, 1975

[21] Appl. No.: 556,043

[52] U.S. Cl. .................................. 303/7; 188/3 R; 303/28; 303/68
[51] Int. Cl.² ............................................ B60T 13/00
[58] Field of Search ............... 303/7, 9, 6 R, 13, 14, 303/68, 69, 71, 28, 32, 40, 29; 137/87, 114, 98

[56] References Cited
UNITED STATES PATENTS

| | | | |
|---|---|---|---|
| 3,003,822 | 10/1961 | McCarthy | 303/9 |
| 3,228,730 | 1/1966 | Schubert | 303/13 X |
| 3,241,888 | 3/1966 | Ternent | 303/9 X |
| 3,272,567 | 9/1966 | Vielmo | 303/9 X |
| 3,294,455 | 12/1966 | Valentine | 303/13 X |
| 3,504,946 | 4/1970 | Valentine et al. | 303/9 |
| R25,969 | 3/1966 | Valentine | 303/29 |

FOREIGN PATENTS OR APPLICATIONS 1,387,540  12/1964  France ..................... 303/9

*Primary Examiner*—Trygve M. Blix
*Assistant Examiner*—Douglas C. Butler
*Attorney, Agent, or Firm*—Ken C. Decker; William N. Antonis

[57] ABSTRACT

A fluid pressure braking system for an articulated vehicle. The system includes valving which senses a failure in the brake service line connection between the tractor and trailer portions of the vehicle. If a failure in the service line connection is detected, the valving closes communication between the tractor and trailer portions of the vehicle and causes actuation of the trailer emergency brakes. When the brakes of the vehicle are released, the valving automatically resets itself to release the trailer emergency brakes.

10 Claims, 1 Drawing Figure

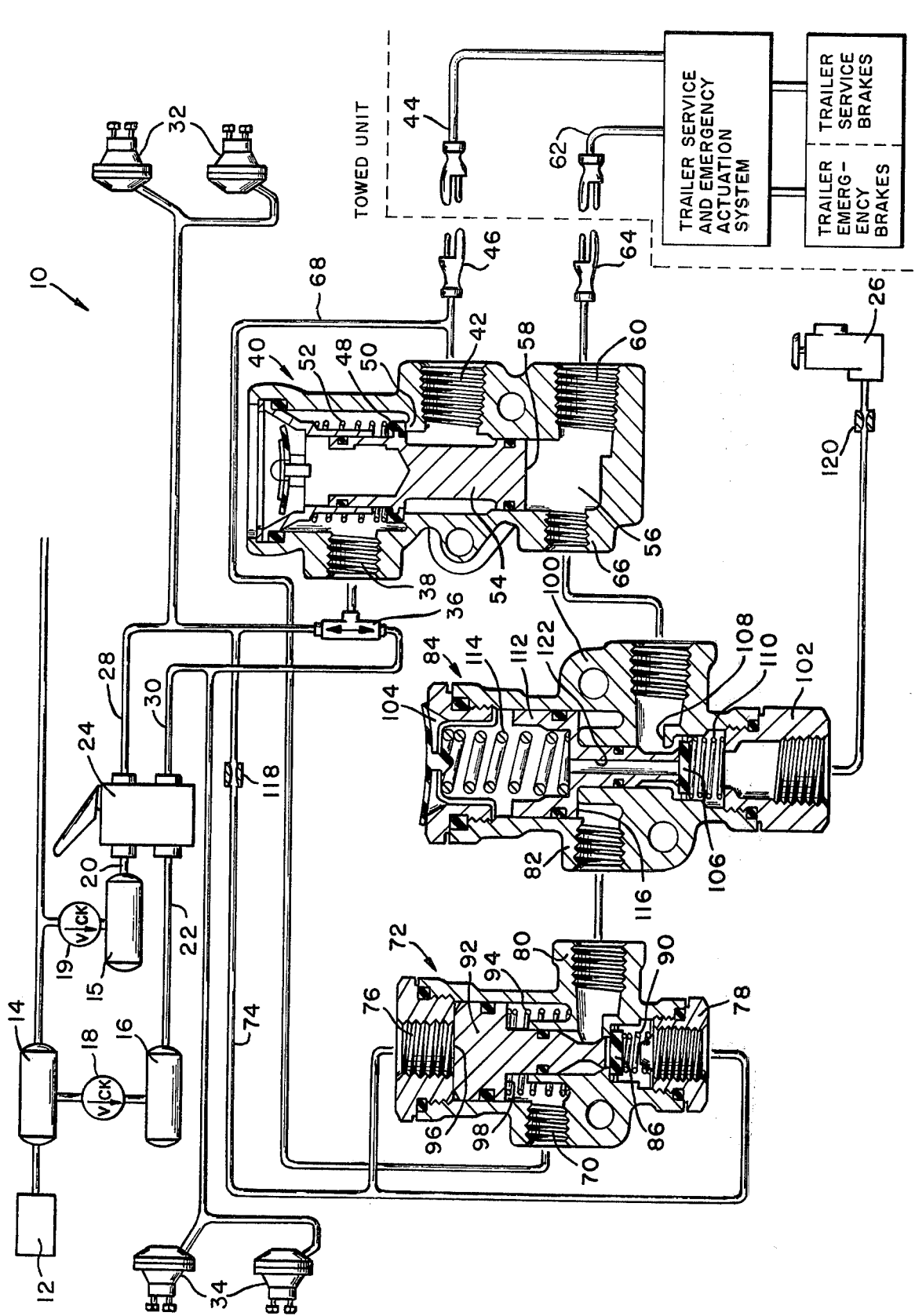

FLUID PRESSURE BRAKING SYSTEM INCLUDING A PRESSURE DIFFERENTIAL RESPONSIVE VALVE DEVICE

BACKGROUND OF THE INVENTION

This invention relates to a fluid pressure actuated braking system for an articulated vehicle.

Existing braking systems for articulated vehicles, such as the system disclosed in U.S. Pat. No. Re. 25,969, provide both tractor and trailer braking when one of the lines connecting the tractor and trailer braking systems fails. However, in systems of this type, no trailer braking is available in this situation until pressure loss from the failure reduces tractor supply pressure to a relatively low level. When this low pressure level is attained the system applies the trailer emergency brakes, which cannot be released until pressure in the tractor portion of the braking system can be increased.

The system disclosed in the present application detects a failed control line by sensing a pressure differential between the tractor and trailer portions of the service control circuits, whereupon the trailer service line is closed and the trailer supply line is vented to thereby actuate the emergency brakes. Since this pressure differential will be detected before the tractor supply will be depleted to any substantial extent, a higher pressure level will be retained to actuate the tractor service brakes and the emergency brakes on the trailer will be actuated shortly after the pressure differential is detected. Since the emergency brakes will be actuated at substantially the same time that the tractor service brakes are actuated, vehicle stopping ability and stability are improved. Furthermore, upon release of the tractor service brakes, the system automatically resets to charge the trailer supply line to release the trailer emergency brakes.

SUMMARY OF THE INVENTION

Therefore, an important object of our invention is to provide valving for use in a vehicle air pressure braking system for articulated vehicles which senses a service line coupling failure between the portions of the vehicle, and which responds to such a failure by terminating communication between the portions of the vehicle, and by actuating the emergency brakes on the trailer.

Another important object of our invention is to conserve the air pressure supply on the tractor or towing unit of the articulated vehicle when a failure in the brake service line coupling between the units of the vehicle occurs.

Another important object of our invention is to use the emergency brakes on the trailer to provide braking during a failure in the service line coupling between the tractor and trailer portions of articulated vehicles.

Still another important object of our invention is to provide complete control of the braking on both tractor and trailer during a failure in the aforementioned service line coupling between the tractor and trailer units of an articulated vehicle by using only normal operation of the operator-actuated foot control valve.

Still another important object of our invention is to improve overall vehicle stability and stopping ability during braking after a failure in the aforementioned service line coupling.

DESCRIPTION OF THE DRAWINGS

The sole FIGURE of the drawing is a schematic illustration of a vehicle air pressure braking system, with the valving made pursuant to the teachings of our present invention illustrated in cross section.

DETAILED DESCRIPTION

Referring now to the drawings, a portion of an air-actuated braking system for an articulated vehicle is indicated generally by the numeral 10. The system 10 includes the standard air compressor 12 which is operated by the vehicle engine and which charges air reservoir tanks 14, 15, and 16 which are carried by the tractor or towing unit of the articulated vehicle. The one way check valves 18 and 19 permit fluid communication from the reservoir 14 to the reservoirs 15 and 16, but prevents communication in the reverse direction. Each of the reservoirs 15 and 16 are connected to corresponding inlets 20 and 22 of an operator-actuated brake control valve 24. The brake control valve 24 may be of any type well known to those skilled in the art, such as the brake control valve disclosed in U.S. Pat. No. 3,266,850, owned by the assignee of the present invention and incorporated herein by reference. The reservoir 14 is also connected to the inlet of an operator-actuated push-pull control valve 26, which may be of any type well known to those skilled in the art, such as the push-pull valve disclosed in U.S. Pat. No. Re. 25,969, owned by the assignee of the present invention and incorporated herein by reference.

The brake valve 24 further includes an outlet port 28 which is connected to the inlet port 20 and an outlet port 30 which is connected to the inlet port 22. When the valve 24 is released, communication between the inlet ports 20 and 22 and their corresponding outlet ports 28 and 30 is terminated, but when a brake application is effected, the inlet ports 20 and 22 are then communicated to their corresponding outlet ports 28 and 30 to effect a brake application. The rear brakes 32 of the tractor are connected to the outlet port 28 and the front brakes 34 are connected to the outlet port 30. The outlet ports 28 and 30 are also connected to corresponding inlet ports of a conventional double check valve 36, the outlet of which is connected to the inlet port 38 of a tractor protection valve 40. The double check valve 36 may be of any conventional type well known to those skilled in the art, and permits only the higher of the fluid pressures communicated to ports 28 and 30 of brake valve 24 to be communicated to the inlet port 38.

Valve 40 further includes an outlet port 42 which is connected to a trailer supply line 44 which interconnects with the service braking system (not shown) carried by the trailer for actuating the brakes thereon. The trailer supply line 44 is connected to the outlet port 42 by a hose and coupling illustrated schematically at 46. As pointed out hereinabove, an important object of this invention is to conserve the tractor air supply and to actuate the emergency brakes of the trialer if such a failure of the coupling 46 or line 44 should occur. A valve element 48 and a valve seat 50 are located within the valve 40 between the inlet 38 and the outlet 42. A spring 52 yieldably urges the valve element 48 into sealing engagement with the valve seat 50, thereby preventing fluid communication between the inlet 38 and the outlet 42. A fluid pressure responsive piston 54 is integral with the valve element 48 and is adapted to urge the latter away from the valve seat 50 in opposition to the spring 52 in response to fluid pressure communicated into a chamber 56 defined between the face 58 of the piston 54 and the wall of the housing of the valve 40. An outlet port 60 communicates the chamber 56 to the emergency line or conduit 62 through a releasable coupling 64. The trailer emergency supply line or conduit 62 is connected to appropriate reservoirs and valving carried by the tractor so that fluid pressure communicated through line 42 releases the aforementioned emergency brakes carried by the trailer. The chamber 56 is further provided with an inlet port 66.

A first monitor line 68 couples the outlet port 42 of the valve 40 with an inlet port 70 of another valve 72. A second monitor line 74 connects the outlet 28 of brake valve 24 to inlets 76 and 78 of the valve 72. Valve 72 further includes an outlet port 80 which is connected to inlet port 82 of still another valve 84. A valve element 86 is slidably disposed within the valve 72, and is urged into sealing engagement with a valve seat 88 by a spring 90. A pressure differential responsive piston 92 is also slidably mounted within the valve 72, and is urged away from the valve element 86 by spring 94 to permit the spring 90 to urge the valve element 86 into sealing engagement with the valve seat 88. One face 96 of piston 92 is communicated to the fluid pressure level at the inlet 76, and the other face 98 of the piston 92 is communicated to the pressure at the inlet port 70. Consequently, when the pressure in port 76 exceeds the pressure at port 70 by more than the predetermined amount necessary to overcome the force of the spring 94 and the force differential created by the differential areas of the faces 96 and 98, the piston 92 is urged downwardly in opposition to spring 94 to thereby urge valve element 86 away from the valve seat 88.

The valve 84 includes the inlet port 82, an outlet port 100 which is connected to the inlet port 66 of the tractor protection valve 40, another inlet port 102 which is connected to the outlet of the push-pull valve 26, and an exhaust port 104. A valve element 106 is slidably mounted within the valve 84 and is urged toward a valve seat 108 by a spring 110. When the valve element 106 is sealingly engaged with the valve seat 108, communication between the ports 102 and 100 is prevented. However, a piston 112 is also slidably mounted within the valve 84, and a spring 114, which is much stronger than the spring 110, yieldably urges the piston 112 against the valve element 106. Consequently, the piston 112 urges the valve element 106 away from the valve seat 108 to permit communication between the ports 102 and 100. The piston 112 is provided with a fluid reaction face 116 which is exposed to the fluid pressure level at the inlet 82. Consequently, when the fluid pressure level at inlet 82 exceeds the predetermined value, the piston 112 will be urged upwardly viewing the drawing, thereby permitting the spring 110 to urge the valve element 106 into sealing engagement with the valve seat 108. The piston 112 defines a passage 112 therewithin which communicates the port 100 to the exhaust port 104 when the piston 112 is moved out of engagement with valve member 106.

In order to prevent transient pressure surges within the system from operating the various valves 26, 40, 72, and 84, a first orifice 118 is provided in monitor line 74 and a second orifice 120 is provided in the line connecting the push-pull valve 26 of the inlet port 102 of the valve 84.

MODE OF OPERATION

The various components of the braking system 10 are illustrated in the drawing in the positions which they assume when the brakes of the vehicle are released and when all braking pressure has been exhausted from the system. When the vehicle is to be moved, the engine is started to initiate operation of the air compressor 12 to charge the air reservoirs 14, 15 and 16. When a predetermined pressure level has been achieved in these reservoirs, the operator actuates the push-pull valve 26 to communicate their pressure therethrough into the emergency conduit 62 and therefore to the emergency actuators on the trailer. This air pressure releases the emergency actuators, and the relatively high fluid pressure in chamber 56 acts upon the face 58 of piston 54 to urge the valve element 48 away from the valve seat 50 to permit substantially uninhibited fluid communication between the inlet port 38 and outlet port 42. Therefore, substantially uninhibited fluid communication is permitted between the outlet ports 28 and 30 of the brake valve 24 and the service conduit 44 of the trailer portion of the vehicle.

It will be noted that during normal operation of the service braking system of the vehicle, the pressure levels at ports 28, 30 and at the coupling 46 will be substantially equal. For example, when the brakes of the vehicle are released, the pressure levels at these points should be at substantially atmospheric pressure, and when the brakes are applied the pressure at these points will be the pressure level specified by the vehicle operator in response to the amount of force exerted upon the treadle of the valve 24. However, should the coupling 46 or the service line 44 malfunction during a brake application, the pressure level at the coupling 46 will immediately drop to substantially atmospheric pressure, while the pressure level at outlet port 28 will still be at the relatively high pressure established by the vehicle operator. During normal operation of the vehicle, since the port 76 of valve 72 is connected to the port 28 of brake valve 24 and since the port 70 of valve 72 is connected to coupling 46, the piston 92 will remain in the position illustrated in the drawings, thereby maintaining the valve elements 86, 88 closed, to thereby prevent communication of fluid pressure to the face 116 of piston 112 within the valve 84. Consequently, the piston 112 of valve 84 remains in the position illustrated in the drawings, holding valve element 106 away from valve seat 108, to permit substantially uninhibited fluid communication through from the push-pull valve 26 into the trailer supply line or conduit 62. However, when the aforementioned malfunction of the service conduit 44 or its associated coupling 46 occurs, a pressure differential will be created across the pressure differential responsive piston 92, since the pressure which is communicated to the face 96 of piston 92 will be substantially less than the pressure communicated to the face 98 of piston 92. This pressure differential urges the piston 92 downwardly, viewing the FIGURE, so that piston 92 urges the valve element 86 away from the valve seat 88 to communicate the outlet port 80, and therefore the face 116 of piston 112 of valve 84, to the high pressure fluid at the inlet port 78. Of course, port 78 is communicated to the relatively high fluid pressure level established by the vehicle operator at the port 28 of the valve 24. The relatively high fluid pressure thereby communicated to the face 116 of piston 112 urges the latter upwardly (viewing the drawing) and thereby permits the spring 118 to urge the valve element 106 into sealing engagement with the valve seat 108, thereby terminating communication between the chamber 56 and the emergency conduit 62. Further upward movement of the piston 112 after the valve elements 106, 108 are closed, opens communication between the outlet port 100 and the exhaust port 104 through the passage 112 defined within the valve piston 112, thereby venting the chamber 56 to permit the spring 52 to urge the valve element 48 into sealing engagement with valve seat 50. Consequently, fluid pressure communication between the brake valve 24 and the service conduit 44 is terminated to thereby preserve the integrity of the fluid pressure system of the tractor. Since the fluid pressure in the chamber 56 has been vented to the exhaust port 104, and since the emergency conduit 62 is communicated with the chamber 56, an emergency application of the trailer emergency brakes will be effected.

When the vehicle operator releases the brake valve 24, the pressure level at the outlet port 28 again returns to substantially atmospheric pressure. Consequently, the pressures acting on the faces 96 and 98 of the piston 92 within the valve 72 are both exposed to substantially atmospheric pressure, causing the spring 94 to urge the piston 92 to the position illustrated in the drawings. Return of the piston 92 to this position permits the valve elements 86, 88 to close, terminating fluid communication to the face 116 of the piston 112. Consequently, the spring 114 again urges the piston 112 to the position illustrated in the drawings, thereby also urging valve element 106 away from valve seat 108 to permit substantially uninhibited fluid communication between the ports 100 and 102 so that the trailer emergency brakes are released when the operator releases the brake valve 24. Consequently, the vehicle may be moved to a place where appropriate repairs may be made, with the vehicle capable of being stopped by the normal service brake on the tractor and by the emergency brakes on the trailer.

We claim:

1. In a fluid pressure braking system for an articulated vehicle including a towing unit having service brakes and a towed unit having service and emergency brakes, a service brake actuation system having a first portion for communicating fluid pressure to the service brakes on the towing unit, a second portion for communicating fluid pressure to the service brakes on the towed unit, and a service conduit communicating the first portion with the second portion, an operator-actuated control valve for communicating fluid pressure through said service brake actuation system, and pressure differential responsive means for sensing a pressure differential between the fluid pressure level in said service conduit and the fluid pressure level at said operator-actuated control valve, said pressure differential responsive means including means for actuating said emergency brakes when said pressure differential attains a predetermined level.

2. The invention of claim 1:
said pressure differential responsive means including further means terminating fluid communication between the portions of the service braking system when said pressure differential attains said predetermined value.

3. In a fluid pressure braking system for a vehicle having service brake, a service braking system including a first portion for actuating some of the service brakes, a second portion for actuating the rest of the service brakes, and a service conduit connecting said portions, operator-actuated valve means for controlling fluid pressure communication in the service braking system, and pressure differential responsive means for sensing a fluid pressure differential between the fluid pressure level in said service conduit and the fluid pressure level at said operator-operated control valve, said pressure differential responsive means including means isolating said first portion of the service braking system from the second portion of the latter when said pressure differential attains a predetermined level.

4. The invention of claim 3:
said braking sytem further including emergency brakes, and an emergency system for supplying fluid pressure to said emergency brakes to maintain them in their released condition, said pressure differential responsive means including further means to reduce the fluid pressure level in the emergency system to actuate said emergency brakes when said pressure differential attains said predetermined level.

5. The invention of claim 3:
said pressure differential responsive means including first valve means having an inlet connected to said operator-operated valve means, an outlet connected to said service conduit, and a valve member responsive to a pilot pressure to permit communication between the inlet and outlet when the pilot pressure exceeds a predetermined level and to terminate communication between the inlet and outlet when the pilot pressure drops below the predetermined level, said pressure differential responsive means further including second valve means responsive to the pressure differential between said service conduit and said operator-operated valve means to reduce said pilot pressure below said predetermined level when said pressure differential attains said predetermind value.

6. The invention of claim 5:
said braking system further including emergency brakes and an emergency system for supplying fluid pressure to said emergency brakes to maintain them in their released condition, said pilot pressure being the fluid pressure level in said emergency system.

7. In a fluid pressure braking system for a vehicle having service and emergency brakes, a service braking system including a first portion for actuating some of the service brakes and a second portion for actuating the rest of the service brakes, an emergency system for supplying fluid pressure to said emergency brakes to maintain them in their released condition, operator-actuated valve means for controlling fluid pressure communication in the service braking system, first valve means having an inlet connected to one of said portions of the service braking system and an outlet connected to the other portion of the service braking system, and pressure responsive means responsive to the fluid pressure level in the emergency system for terminating communication between the inlet and outlet when the pressure level of the emergency system drops to a predetermined value, and second valve means responsive to the pressure differential between the outlet of said first valve means and the operator-operated valve for reducing the pressure in the emergency system below said predetermined value whereby the first valve means terminates communication between the portions of the service braking system and the emergency brakes are actuated.

8. The invention of claim 7:
said second valve means including a first valve member having an inlet connected to the fluid pressure level in said service braking system, an outlet, normally closed valve elements normally preventing communication between the inlet and the outlet, and a pressure differential responsive piston responsive to a pressure differential in excess of a predetermined value between the outlet of the first valve means and the operator-operated valve to open said normally closed valve elements.

9. The invention of claim 8:
said second valve means further including a second valve member having an inlet and outlet connected in said emergency system, normally open valve elements, normally permitting communication between said inlet and outlet, a pressure responsive piston responsive to the pressure level at the outlet of said first valve member to close said normally open valve elements when the pressure level at the outlet of the first valve member exceeds a predetermined level.

10. The invention of claim 9:
said first valve means including a second inlet communicated to the outlet of said second valve member, said pressure responsive means being responsive to the fluid pressure level at said second inlet to terminate communication to said outlet when the pressure level at said second inlet drops below a predetermined level;
said second valve member including an exhaust port, said normally open valve elements including means communicating the outlet of the second valve member to said exhaust port when the normally open valve elements prevent communication between the inlet and outlet of the second valve member.

* * * * *